Jan. 13, 1970 D. NITZAN ET AL 3,490,008

MULTIAPERTURE MAGNETIC CORE DEVICE

Filed Aug. 30, 1963 6 Sheets-Sheet 1

INVENTOR.
DAVID R. NITZAN
JOSEPH P. SWEENEY
BY
Curtis, Morris + Safford

*INVENTOR.*
DAVID R. NITZAN
BY JOSEPH P. SWEENEY lewtic, movin + lazzord

MULTIAPERTURE MAGNETIC CORE DEVICE

Filed Aug. 30, 1963 6 Sheets-Sheet 3

INVENTOR.
DAVID R. NITZAN
JOSEPH P. SWEENEY
BY
Lewis, Morris & Safford

INVENTOR.
DAVID R. NITZAN
JOSEPH P. SWEENEY
BY
Curtis, Morris & Safford

TOP VIEW

BOTTOM VIEW

INVENTOR.
DAVID R. NITZAN
JOSEPH P. SWEENEY
BY
Lewis, Movius & Safford

INVENTOR.
DAVID R. NITZAN
JOSEPH P. SWEENEY

BY

Curtis, Morris & Safford

United States Patent Office 3,490,008
Patented Jan. 13, 1970

3,490,008
MULTIAPERTURE MAGNETIC CORE DEVICE

David Nitzan, Palo Alto, Calif., and Joseph P. Sweeney, Harrisburg, Pa., assignors to AMP Incorporated, Harrisburg, Pa.

Filed Aug. 30, 1963, Ser. No. 305,780
Int. Cl. G11b 5/00
U.S. Cl. 340—174 25 Claims This invention relates to improved multipath magnetic core structures and circuits of the type utilized to manipulate intelligence in binary form.

Considerable work has been done in developing multipath or multi-leg magnetic core devices for use in handling intelligence. This work has been sponsored by the realization that the magnetic core device has certain intrinsic advantages over other electronic or solid state components such as vacuum tubes, transistors and the like, with respect to stability of operation, longevity and function. Thus, it is that multiaperture magnetic core shift registers and logic modules have been developed and are being used to complement and in many instances replace other electronic component throughout the complete range of electronic circuit applications.

An example of a highly successful multiaperture device is shown in the U.S. Patent No. 2,995,731 to Joseph P. Sweeney titled Wiring Arrangements for Shift Registers Employing Magnetic Cores. Each core utilized in the device shown in the Sweeney patent includes a centrally disposed major aperture and at least two minor apertures forming input and output or receiver and transmitter apertures, respectively. The geometry of the core employed is such that paths of possible flux closure about the major and minor apertures are defined to permit distinctive flux orientations to be achieved to in turn define binary intelligence in the form of one and zero as well as a particular orientation of flux closure about a transmitter minor aperture preparatory to the transfer of a binary one. Intelligence input and transfer is achieved through a circuit including coupling windings, advance windings and prime windings linking distinctive portions of the cores and adapted to be supplied by input, advance and prime current. During the period when a given core is transmitting to an adjacent core, backward transfer of intelligence to a preceding core is prevented by the inclusion of a holding winding threading the preceding core and adapted to be energized by advance current to block such core from being switched. With this arrangement, intelligence in binary form may be stored within a given core and controllably transferred between cores in a cycle including input, prime and advance phases of a transfer cycle.

Considerable experience with the type of device shown in the Sweeney patent has demonstrated that the ultimate test which such device must meet involves a transfer of intelligence without spurious loss or gain over a specified range of advance and prime current variations. If satisfactory operation cannot be achieved over a suitable range the device will invariably fail to meet commercial or military specifications which require operation over a temperature range of typically −55° to +75° with a 5 to 15% expected deviation in supply current or voltage. As an additional requirement the output pulse achieved by the device must offer a sufficient discrimination between one and zero outputs as well as adequate power to be utilized by existing electronic equipment. If these criteria are not met by the device it can have little commercial use or significance except as for development of the art.

With the arrangement employed in the Sweeney patent, two individual multiaperture cores are employed for each intelligence bit capability of the unit. This requirement of two cores per bit has been the general rule for a number of years and while the state of the art indicates development of a large number of composite core multiaperture structures which are ostensibly capable of storing numbers of bits per core, no fully operable device of commercial significance is known to have been heretofore developed capable of effecting a direct bit transfer between bit positions within the same core. The reason for this lies in the delicate balance of states of flux closure within a core structure necessary to define the required intelligence states and the interim or control states for transfer of intelligence.

Numerous extremely complicated core structures have been devised to provide isolation between bit positions, but, insofar as is known, the operation of such devices is so sharply limited as to be practically useless. Moreover, the manufacturing cost including die work and a high rejection rate of complicated core geometries has resulted in a product which is prohibitive cost wise; the cost per bit being ten or twenty times that of the prior art cost per bit including the two core per bit scheme taught by the Sweeney patent. In summary, the short-comings of the prior art approach to a multiaperture device utilizing less than two cores per bit have been those of both operational limitations and cost of production.

Accordingly, it is one object of the present invention to provide multi-path magnetic cores useful in shift registers and the like defining more than one possible bit position per core.

It is a further object of invention to provide an improved multi-path magnetic device capable of transferring intelligence between bit positions within a core in a manner which is fully compatible in range of operation and cost with existing core devices and electronic components.

It is still a further object to provide an improved multiaperture magnetic core capable of storing an intelligence bit in more than one possible position to achieve wiring, circuit and packaging advantages.

It is another object of invention to provide a multiaperture core and circuit of improved range of operation for use in perfoming intelligence handling functions including the shifting, counting, storing or steering of intelligence in binary form.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the condition of a particular use.

Briefly summarized, the invention provides a multiaperture magnetic core having a geometry including symmetrically similar magnetic paths forming a generally rectangular shape to define at least two core halves of relatively long path length of possible flux closure. Each of the halves of the integral core structure includes a generally rectangular major aperture and at least two minor apertures with eared portions of material formed adjacent the minor apertures extending into the major aperture to provide controlled cross-sectional areas of magnetic material adjacent each minor aperture. A center leg common to each core half includes a cross-sectional area of material which is twice the cross-sectional area of the remaining legs of the structure. The path length as measured from a point adjacent a given major aperture about the given major aperture is substantially half the path length measured from such point about both major apertures. At least one of the minor apertures is utilized as an output aperture for each half of the core structure. As such, the output minor aperture is threaded by a coupling loop adapted to respond to flux changes in material about such output aperture to produce a suitable output pulse. Additionally, the output minor aperture, in accordance with the technique employed, is threaded with a prime winding adapted to prime flux under such output winding when the associated core half is in a state representative of a one but not prime flux under such winding when the associated half is in a state representing a zero. Advance windings are employed threading the major apertures of each half of the core structure adapted to drive each half to transfer the intelligence state thereof to an adjacent core half and thereafter to further cores or utilization circuits.

At least an auxiliary minor aperture is included in each half of the core structure for use as either an input minor aperture, an aperture for performing logic or a sampling aperture suitable for accomplishing nondestructive read-out of the intelligence state of the core half.

The distinctive paths of magnetic material formed in each half, in addition to being made of appropriate relative lengths to establish proper threshold, include specialized shaping to improve the efficiency of the core with respect to fringe air flux loss and the presence of zones of unsaturated or "mush" material during operation. The geometry of the core contemplated by the invention readily facilitates core manufacture on the one hand and on the other hand, achieves proper isolation of flux switching and definition of stable states of magnetization.

Because of these factors, flux switching may be effected in one half of the core structure without disturbing the particular state then existent in the other half of the core and the particular state existent in one half may be transferred to the other half without loss of intelligence. The input, control and transfer circuits employed by the invention are related and adapted to the particular core geometry of the invention to best use the advantages inherent therein.

Figure 1:
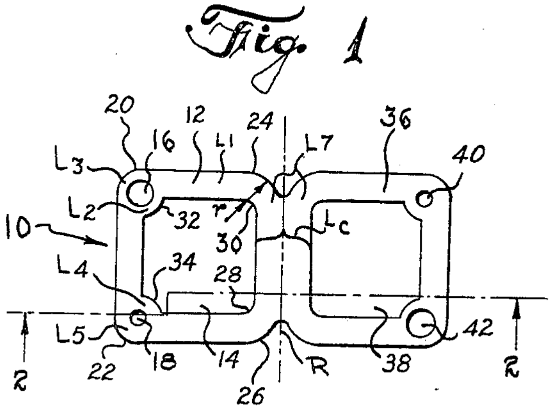
FIGURE 1 is a plan view of one embodiment of the improved core structure contemplated by the invention.
Figure 2:
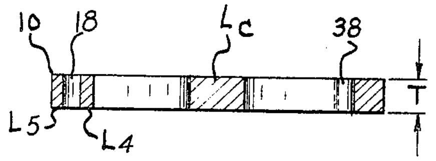
FIGURE 2 is a sectional elevation of the core structure shown in FIGURE 1.

Referring now to FIGURES 1 and 2 there is shown one embodiment of the core structure contemplated by the invention including an integrally formed body of magnetic material 10 comprised of similar halves 12 and 36 including major apertures 14 and 38 and minor apertures 16 and 18 and 40, 42, respectively. Considering the general shape of half 12, which is identical to that of half 36, it will be seen that the interior corners 28 and 30 and the exterior corners 20, 22, 24 and 26 are rounded as by radii indicated as $r$ and R from a common point interior of the periphery of the core half. The interior corners 32 and 34 of the outside portion of the core are reversely rounded to extend into the major aperture 14. The minor apertures 16 and 18 are positioned at the outside corners of the core half, symmetrically disposed between the outside and inside radius of material. The width of core material $L_1$ is substantially maintained in each of the four legs of the core halves 12 and through the portion of material surrounding aperture 18; the cross-sectional areas of legs $L_4$ and $L_5$ being substantially equal to the cross-sectional area of $L_1$. The cross-sectional area of material adjacent aperture 16, $L_2$ plus $L_3$, is held to be slightly less than $L_1$. This is practically accomplished by making aperture 16 of a diameter slightly larger than aperture 18. The thickness T, as shown in FIGURE 2, is substantially constant in all portions of the core.

Aperture 16 is utilized as the output or transmitting aperture and its constricting cross-sectional area serves to limit amount of switchable flux about the aperture. This feature has been found to provide an advantage with respect to a reduced level of voltage transmitted during the transfer of a zero from the core. Aperture 18 serves as an auxiliary aperture capable of being used for input purposes in a manner to be described hereafter or for an auxiliary output winding capable of sampling the intelligence state of the core without interfering with such state or its transfer into or out of the core.

Figure 1A:
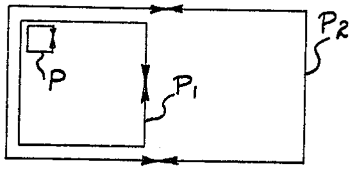
FIGURE 1A is a schematic diagram of relative flux paths defined by the core structure of FIGURE 1.

FIGURE 1A depicts the path lengths as viewed from the transmitting aperture 16 including a path length P about the aperture, a path length $P_1$ about core half 12 and a path length $P_2$ about both halves of the core. The geometry of the core 10 is such that the path length P is approximately one-sixth of the path length $P_1$ and path $P_1$ is approximately one-half that of path length $P_2$. Because of this, the mean path threshold of core material seen by a winding threading the core, being proportionate to path length, is sufficiently differentiated as to permit a proper isolation of different portions of the core from flux switching in a given path length; even in the presence of substantial variations or combinations of applied MMF which may be expected in any practical circuit.

From FIGURES 1 and 2 it will be apparent that the cross-sectional area of the various legs of the core structure 10 is identical in common portions. Thus, the commoned leg joining the halves of core 10 includes a cross-sectional area $L_c$ which is equal to at least twice the cross-sectional area of $L_1$. This is important to permit each core half to serve as a possible bit position.

Core 10 may be formed of saturable magnetic material of the type having a substantially rectangular hysteresis characteristic curve. A hard fired commercial ferrite of the type manufactured by the Indiana General Corporation of Valparaiso, Ind. and identified as their material No. 5209 is satisfactory. It is preferred that the material utilized have a remanent flux capacity of approximately 40 maxwells at 25° C., 50 maxwells at −55° C. and 38 maxwells at +75° C. with thresholds of 650 milliampere turns, 1,000 milliampere turns and 440 milliampere turns at the previously mentioned temperatures, respectively. While the present invention contemplates the core geometry in the form and shape shown in FIGURE 1, it is to be understood that other and different core shapes may be employed with intended operational sacrifices. For example, a geometry similar to that of FIGURE 1 can be used having squared corners with an expected increase in the amount of "mush" material and incident loss of definition in magnetic states achieved by the core.

The corner positioning of the minor apertures may be altered with the apertures being disposed generally in horizontal legs of the core. It has been found, however, that such positioning complicates the die utilized to form the core and increases the "mush" areas of unsaturable material adjacent each minor aperture. More importantly, and as an additional feature, the particular placement of the minor apertures, including the diagonal placement of the transmitting apertures, such as 16 and 42, greatly facilitates assembly and permits a unique packaging arrangement not otherwise possible. Finally, the particular shape and length of the individual halves may be altered to a limited extent but a depreciation in the isolation between core halves can be expected. These and other changes are considered to be within the scope of the invention, it being understood that such changes will achieve cost savings at the sacrifice of operational advantages offered by the preferred embodiment. In order to demonstrate the relative dimensions employed in a core successfully constructed and tested, the following dimensions in inches are included:

| | |
|---|---|
| Over-all length | .480 |
| $L_1$ width | .040 |
| $L_c$ width | .080 |
| Enlarged minor aperture diameter | .032 |
| Auxiliary minor aperture | .028 |
| Core thickness T | .042 |

For a more complete understanding of the use and advantages of the novel core shape of the invention as shown in FIGURES 1–2, reference will now be made to FIGURES 3 and 4A–4I to describe the control and transfer mechanism possible with the core of the invention in conjunction with a prefered circuit embodiment.

Figure 3:
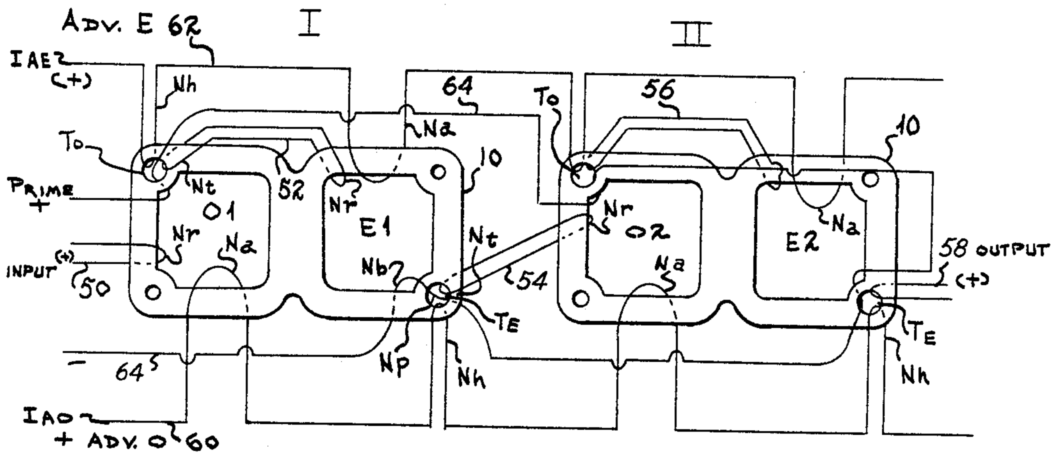
FIGURE 3 is a schematic diagram showing two of the core structures depicted in FIGURE 1 wired in accordance with the transfer and control circuit of the invention.

Thus, with respect to FIGURE 3, two cores 10 are positioned and threaded by appropriate drive and transfer windings adapted to effect a controlled storage and transfer of intelligence in binary form. For the purposes of understanding the device shown in FIGURE 3, cores 10 may be considered as bit positions I and II of a unilateral shift register adapted to perform any number of logic functions. As a brief comparison with the prior art, it will be noted that each core 10 in forming a distinct bit position replaces two separate cores required by prior art devices. In further comparison with prior art terminology, it is useful to label each core half in accordance with the usual odd and even scheme. Thus, the first core 10 in bit position I is divided into halves $O_1$ and $E_1$ and the core 10 in bit position II is divided into halves $O_2$ and $E_2$; each O or E half representing a core structure capable of sustaining a stable state representative of intelligence. As with the scheme utilized in the prior art, the intelligence transfer mechanism includes transfer progressing in the manner $O_1$ to $E_1$, $E_1$ to $O_2$, $O_2$ to $E_2$, etc.

With respect to each core 10, apertures 16 and 42 are utilized as transmitter apertures and are assigned the symbols $T_O$ and $T_E$, respectively. The auxiliary minor apertures 18 and 40, which serve no specific function with respect to the circuit of FIGURE 3 may be considered as offering a readout capability, or, alternatively, an input capability in a manner which will be described more completely hereinafter.

Threading core 10 in bit positions I and II are advance, prime and transfer windings adapted to accomplish the above mentioned mode of intelligence transfer; namely, into, through and out of bit positions I and II. The transfer windings include a register input winding 50 threading the major aperture of core half $O_1$ and a register output winding 58 threading the transmitting aperture $T_E$ of core 10 in bit position II. Windings 50 and 58, while denominated input and output windings, may, of course, represent portions of coupling windings linking cores preceding and following the particular cores shown in bit positions I and II, or may represent windings feeding and supplying, respectively, bit positions I and II from and to other electronic equipment. For example, winding 50 may be considered as connected to some pulse developing source triggered by one or zero binary intelligence in pulse form in a communication channel and winding 58 may be considered as connected to some utilization means such as a counter or a relay having a proper sensitivity for the type of signal developed on winding 58.

Additionally, considered as transfer windings are the coupling loops 52, 54 and 56. Loops 52 and 56 operate to transfer intelligence from core halves $O_1$ and $O_2$, respectively, to core halves $E_1$ and $E_2$, respectively. Coupling loop 54 operates to transfer intelligence from core to core through a transfer from core half $E_1$ to core half $O_2$. In each instance, one portion of the coupling loop threads an outer leg of a transmitter aperture $T_O$ in one core half and the major leg through the major aperture of the receiving core half. The advance circuit linking each core with appropriate turns to effect transfer includes an ADV. O lead 60 threading the major aperture of core halves $O_1$, $O_2$ and, in series, the $T_E$ apertures of core halves $E_1$, $E_2$ and an ADV. E lead 62 threading core halves $E_1$, $E_2$ and, in series, the $T_O$ aperture of core halves $O_1$, $O_2$. Connected to each advance lead is a source of advance pulses capable of supplying currents $I_{AO}$ and $I_{AE}$ to windings 60 and 62, alternatively, to produce transfer of intelligence in a manner to be described hereinafter.

Prime circuit 64 is included having turns threading, in series, the major aperture and aperture $T_O$ of core halves $O_1$, $O_2$ and, thereafter the major aperture and aperture $T_E$ of core halves $E_1$, $E_2$. The advance, prime and transfer circuits above described are linked to the appropriate portion of each core by a number of turns N as shown in FIGURE 3. The following list includes a denomination of such turns along with the number of turns utilized in an actual successful model of one embodiment of the invention.

| | |
|---|---|
| $N_a$—Advance turns | 3 |
| $N_h$—Hold turns | 1 |
| $N_b$—Prime turns in major aperture | 1 |
| $N_p$—Prime turns in minor aperture | 3 |
| $N_t$—Turns in transmitting aperture | 2 |
| $N_r$—Turns in receiving aperture | 1 |

With respect to all driving turns, including $N_a$, $N_h$, $N_b$, $N_p$, $N_t$, and $N_r$, the actual number of turns used must, of course, be sufficient to provide an MMF achieving the particular function of the particular winding involved. Thus, turns $N_a$ must be such that $N_aI_A$ is sufficient to drive the particular core half threaded by $N_a$ into negative saturation. The number of hold turns $N_h$ must be sufficient such that the quantity $N_h$ $I_A$ provides an MMF tending to hold the material encircled by $N_h$ against switching in the presence of substantial back currents flowing in the turns $N_t$ of the aperture threaded by the particular $N_h$ involved. The turns $N_b$ and $N_p$ must be such that the quantities $N_b$ $I_P$, $N_p$ $I_P$ each result in an MMF priming flux into the outer leg encircled by a coupling winding when the core is in the one state without switching flux in other paths including a path about the major aperture. Finally, $N_t$ and $N_r$ must be such that a transfer current of sufficient quantity to provide an MMF sufficient to set the core coupled by $N_r$ will be developed responsive to flux switched in the core coupled by $N_t$.

Turning now to the operation of the circuit of FIGURE 3, reference is made to FIGURES 4A–4I depicting a time sequence diagram including flux states present within the core structures during the phases of input, prime and advance.

With respect to FIGURES 4A–4I, the horizontal lines thereon represent time and the pulses thereon represent current amplitudes typical of the currents developed during the operation of the circuit of FIGURE 3. The cores 10 schematically shown adjacent each phase of operation are labeled I and II according to the denomination set forth in the circuit of FIGURE 3. Only the particular leads and windings of interest to the phase under consideration are included. The flux patterns depicted as existing in each core structure are employed in a conventional manner; the lined arrows representing the flux state produced by the particular current involved, and the flux states not disturbed by the application of such currents. In each of the FIGURES 4A–4I, the particular intelligence state of the core is indicated within a core half major aperture, the intelligence bit one being represented by 1, the intelligence bit zero being represented by 0.

The transfer cycle employed with the circuit of FIGURE 3 will be apparent from the pulses shown with respect to time in FIGURES 4A–4I; being input, prime, advance, prime, advance, etc. Input is made to follow the advance E phase of the cycle. The flux orientation shown in the core structure in FIGURE 4A chosen to define the zero-zero state includes an orientation wherein the material in each half is negatively saturated; the flux orientation being in the clockwise sense with respect to each core half major aperture. It will be noted that with respect to the common leg $L_c$ of core 10, half the flux therein is oriented oppositely with respect to the other half, the net flux being substantially zero through the cross-sectional area of $L_c$. The relative orientation employed in each core half is preferred even though a preliminary examination might indicate that as one result the material of the center leg would be completely "mushy." It has been discovered, however, that the orientation shown is preferable with respect to achieving a satisfactory range of operation in circuits of the type shown in FIGURE 3. An alternate orientation is, however, also contemplated and will be demonstrated.

Figures 4A, 4B, 4C, 4D, 4E, 4F, 4G, 4H, 4I:
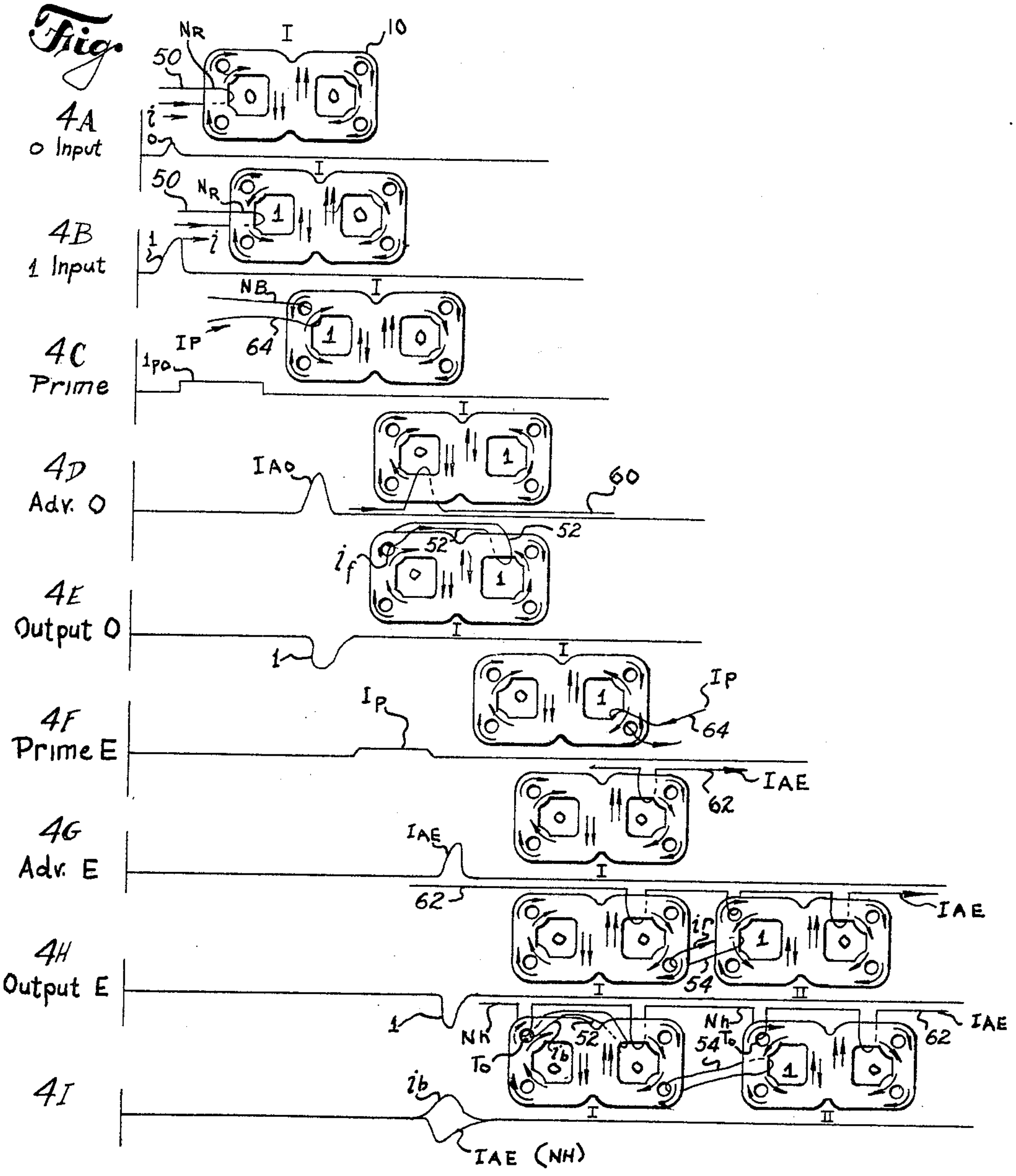
FIGURES 4A–4I are time sequence diagrams of the operation of the circuit shown in FIGURE 3 including schematic core structures, showing the flux orientation for the various phases of circuit operation.

Considering now the input phase with respect to an input signal to core half $O_1$, FIGURE 4A shows a pulse typical of a zero input and the resulting disposition of flux in core I; the MMF $N_ri$ resulting from such pulse being insufficient to switch remanent flux. FIGURE 4B shows a one input wherein the pulse amplitude is considerably larger than that shown in FIGURE 4A to produce an MMF causing a resulting reversal of flux about half the materal surrounding the major aperture of core half $O_1$ as indicated. In this state, core half $O_1$ may be considered as having a net flux of substantially zero, half being in clockwise orientation, half being in counter-clockwise orientation. Because of the geometry of core 10, the material in core half $E_1$ will not be disturbed and the zero state will remain defined by clockwise flux orientation throughout the material constituting core half $E_1$. Following the appication of an input of one to core half $O_1$, core I may be considered as containing one and zero as shown.

The next phase of the transfer cycle is shown in FIGURE 4C wherein prime current, $I_P$, is applied to aperture $T_O$ via lead 64 to reverse the orientation about such aperture in the manner indicated and thereby prime flux in a downward orientation in the outer leg thereof. As indicated in FIGURE 4C, the amplitude of $I_P$ is relatively low and is of a relatively long duration. This prevents $I_P$ from disturbing the flux pattern of core $O_1$ defining the one state and, of course, from disturbing the flux pattern of core half $E_1$ defining the zero state. Turns $N_p$ operate to develop the MMF $N_pI_P$ which should be large enough to effect complete switching in the outer leg, but sufficiently limited to avoid causing flux to be switched about the core major aperture. Turns $N_b$ should be sufficient to preclude the transfer of zero from operating to set the core and limited so that no spurious unsetting of flux will occur. Following the application of $I_P$, core I may be considered as containing one and zero, the one being primed.

FIGURE 4D shows the application of advance current, $I_{AO}$, to lead 60 driving core half $O_1$ into a clockwise flux state. The amplitude and pulse shape shown for $I_{AO}$ is relatively large, being sufficient to rapidly switch flux about the major aperture of core half $O_1$.

At the same time that $I_{AO}$ is applied, a transfer current is developed in coupling winding 52, represented by $i_f$, which operates to set intelligence into core half $E_1$ by reversing the sense of orientation of flux in core half $E_1$ as indicated in FIGURE 4E. The core in bit position I thereafter contains zero and one in core halves $O_1$ and $E_1$, respectively.

The next phase of the transfer cycle is shown in FIGURE 4F wherein $I_P$ is applied via lead 64 to aperture $T_E$ of core half $E_1$. This results in the flux orientation shown wherein flux is primed into the outer leg adjacent $T_O$ in a reverse sense to that shown in FIGURE 4E.

Thereafter, the application of advance current, $I_{AE}$, to advance lead 62 operates to drive the material in $E_1$ in a clockwise sense as shown in FIGURE 4G. The amplitude and duration of $I_{AE}$ are controlled in the manner above indicated with respect to $I_{AO}$. FIGURE 4H shows the transfer of a one from core half $E_1$ to core half $O_2$ in bit position II occurring responsive to $E_1$ being switched by $I_{AE}$. Thus, with respect to bit position II, core half $O_2$ contains one and core half $E_2$ contains a zero. In this manner the one initially set into $O_1$ is transferred to $E_1$ and then to $O_2$ by the above cycle.

Because of the sense of orientation chosen to define the intelligence states, the application of $I_{AO}$ or $I_{AE}$ cannot operate to disturb the flux distribution in a preceding adjacent core half which will invariably be in the clockwise sense in the outer legs thereof; there being no path of flux closure possible with respect to the downwardly oriented flux in the center leg.

FIGURE 4I repeats the transfer mechanism shown in FIGURES 4H and 4G but is included to demonstrate the operation of turns $N_h$ with respect to a preceding core half; in the case shown, core half $O_1$. This situation, of course, occurred during the application of $I_{AO}$ to $O_1$ as the one contained therein was transferred to $E_1$ but is better demonstrated with respect to the $E_1$ to $O_2$ transfer. As flux is switched in core half $E_1$ responsive to $I_{AE}$, a back current $i_b$ will be generated in coupling loop 52 proportional to the rate of flux switched thereunder. The combination of coupling loop impedance, air loss and turns ratio employed will not prevent the pulse formed by $i_b$ from operating to partially set material in core half $O_1$. The presence of temperature and/or manufacturing tolerance variations in either conductor length or in the core may combine with the effects of $i_b$ to fully set core half $O_1$ or at least aggravate the back current problem. If this effect is combined with the flux set by the MMF resulting from a high level zero input pulse, a substantial amount of flux may be set and the ensuing application of $I_{AO}$ will produce an output pulse approaching the one level. For this reason, turns $N_h$ associated with each advance lead are provided threading each aperture $T_O$ of each core half and driven by each advance pulse. Thus, with respect to FIGURE 4I, turns $N_h$ applied to apertures $T_O$ of each core half $O_1$ and $O_2$ result in $I_{AE}$ developing an MMF, $N_h I_{AE}$, in a sense opposing the MMF developing by $N_ti_b$. The net result is a substantial cancellation of the effect $i_b$ in disturbing the preceding core half when the succeeding core half is transmitting a one. As indicated above, the number of turns $N_h$ are fractionally related to the number of turns $N_a$ such that the total MMF applied by turns $N_h$ is only a fraction of the MMF applied by $N_a$. In conjunction with the above description of core and circuit, it is contemplated that the register may be utilized to perform various counter and logic functions by providing a recirculating path wherein the output from the last E core is connected to drive the first O core. For example, winding 58 can be interconnected to winding 50 or, alternatively, to winding 50 and a succeeding stage of registers. A single core 10 may be converted into a flip-flop by interconnecting winding 54 to winding 50 such that intelligence lists are transferred from O, to E, to O, responsive to drive.

Figure 5:
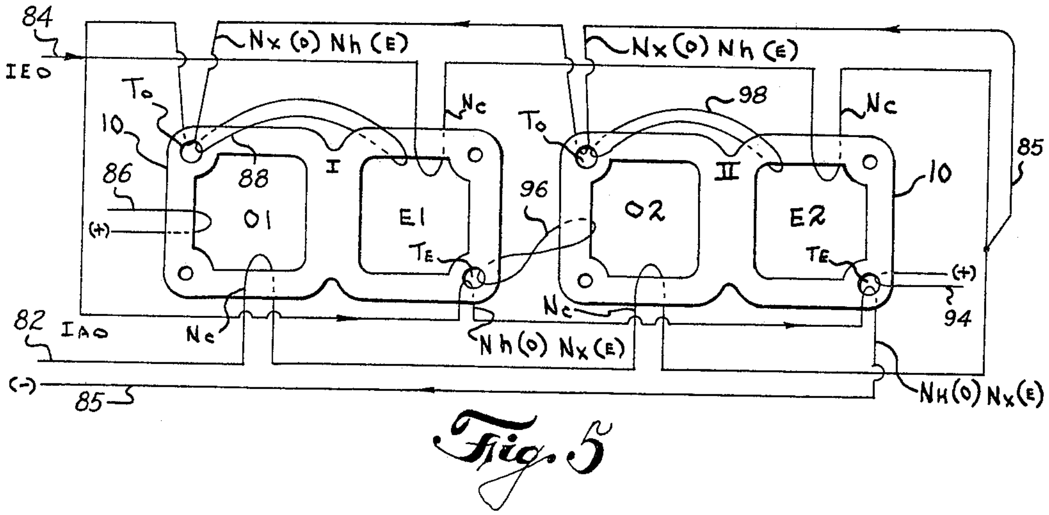
FIGURE 5 is a schematic diagram of two of the cores depicted in FIGURE 1 including a transfer and control circuit variation as a further embodiment of the invention.

FIGURE 5 depicts an alternative circuit arrangement employing the novel core construction of the invention in a shift register embodiment having a function identical to that described with respect to FIGURE 3. The circuit of FIGURE 5 is useful to achieve a larger flux gain between core halves and between cores. In this embodiment, the transfer windings including input and output windings 86 and 94 and coupling windings 88, 96 and 98 are identical to the transfer windings described with respect to the circuit of FIGURE 3. The prime windings utilized with this embodiment are not shown but may be considered as identical to the prime windings utilized in the circuit of FIGURE 3. The advance and prime pulses applied in the cycle depicted in FIGURES 4A–4I, along with the particular states achieved are also similar to the embodiment of FIGURE 5 with the exception of the emphasis given to the flux state resulting from the application of advance current. The basic difference in the circuit lies in the advance turns shown as $N_a$ in FIGURE 3 and shown in FIGURE 5 as $N_c+N_x$ wherein $N_a=N_c+N_x$. FIGURE 5 may be considered as labeled with respect to the ADV. O phase of the transfer cycle. Tracing the application of $I_{AO}$ finds clearing MMF being developed in each core half $O_1$ and $O_2$ by turns $N_c$ threaded through each core half, lead 82 representing the ADV. O drive winding. In like manner, lead 84 is linked by turns $N_c$ to each core half $E_1$ and $E_2$ to supply clearing MMF to such core halves. At the end of the last bit position, here shown as bit position II, leads 82 and 84 are commoned to a third lead 85 which threads in series, through turns $N_x$, apertures $T_O$ of core halves $O_1$ and $O_2$ and thereafter apertures $T_E$ of core halves $E_1$ and $E_2$ in the same relative sense. Application of $I_{AO}$ applies current by lead 85 to apertures $T_O$ with resulting MMF $N_x(O)I_{AO}$ operating on the material about such apertures in a clockwise sense thus constituting a localized advance MMF with respect to the material legs linked by coupling windings 88 and 98. Because of this, substantially all flux possible is switched in such legs. This operates to produce more gain than would otherwise be the case if some of the material in each leg were not driven into negative saturation but were left either in positive saturation or not saturated at all. Without $N_xI_a$, the generated MMF $N_ti_f$ would steer part of the flux switching in $L_1$ into $L_2$, thereby reducing the flux switching in $L_3$ (the output leg). Note that since the flux switching in $L_3$ is elastic, it will be restored towards the end of switching; however, because of its slow rate it will not affect the receiver and will be lost in the coupling-loop resistance. As $L_3$ reaches negative saturation, $N_xI_A$ pushes $L_3$ further into negative saturation (the resulting elastic flux change in $L_3$ is balanced by inelastic flux change in $L_2$). This tends to increase $i_f$ during switching time and thus increase the received flux change. Note that this factor is essentially independent of the flux switching in the main leg. In fact, this is the main cause for a zero loop current. The effect of $N_x(O)$ will be more apparent by considering the flux state shown in FIGURE 4C with respect to aperture $T_O$ wherein the orientation is counter-clockwise in the outer leg adjacent $T_O$ following the application of $I_p$.

The application of $I_{AO}$ operates on turns $N_c$ and $N_x(O)$ during the ADV. O cycle to achieve a full clearing of the core halves driven. Tracing lead 85 from turns $N_x(O)$ through aperture $T_O$ of core half $O_1$ finds such lead connected to turns $N_h(O)$ of each aperture $T_E$ of core halves $E_1$ and $E_2$, in series, and thereafter returning to the negative side of the circuit. As will be apparent from the above description with respect to circuits shown in FIGURE 3 and the description in FIGURES 4A–4I, the application of $I_{AO}$ will also result in holding MMF being applied to apertures $T_E$ through turns $N_h(O)$.

By making turns $N_x$ equal to turns $N_h$, the same physical turns may be made to serve both the turns $N_x$ and $N_h$ functions as indicated in FIGURE 5. During the application of $I_{AE}$, the same turns serve the reverse function, the turns threading apertures $T_O$ serving as $N_h$ turns denominated $N_h(E)$ and the turns threading apertures $T_E$ serving the $N_x$ function and denominated $N_x(E)$. The advantages of the circuit of FIGURE 5 inherent in employing $N_x$ turns to $N_h$ turns will be apparent to those familiar with both manufacturing and pulse supply problems associated with building multi-aperture devices.

Figure 6:
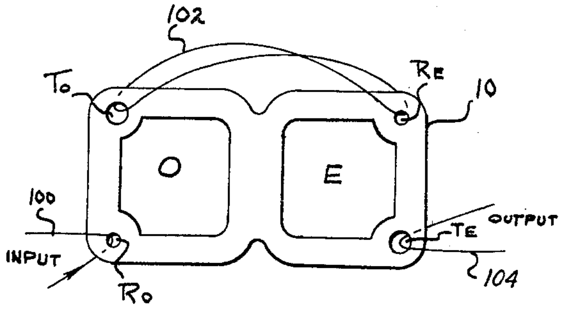
FIGURES 6 and 7 are diagrammatic views showing the windings employed in further embodiments utilizing a different mode of input.

FIGURE 6 shows a further embodiment of a circuit adapted for use with the novel core structure of the invention. The core structure 10 includes core halves O and E, apertures $T_O$ and $T_E$ as well as apertures $R_O$ and $R_E$ representing receiver apertures. The transfer windings 100, 102 and 104 differ from the transfer windings shown with respect to the circuit embodiments above described in that the input portions couple the outer leg of the appropriate aperture. Thus, input winding 100, which may represent a coupling winding from an adjacent core or an input from some signal source, threads the outer leg of core half O through $R_O$. Coupling winding 102 threads the outer leg of aperture $T_O$ in the manner above described and threads the outer leg of material adjacent aperture $R_E$. Winding 104, which may be an output winding to some utilization circuit or part of a coupling winding to an adjacent core, threads the outer leg of material adjacent aperture $T_E$. The remainder of the circuit including advance and prime leads as well as turns $N_a$, $N_p$, $N_h$, or $N_c$, $N_p$, $N_h$ and $N_x$ may be as above described. The operation of the circuit is identical to that shown and above described with the exception that the actual flux disposition will be altered in accordance with the type of input shown in FIGURE 6. The result of the transfer mechanism is the same insofar as input and output pulses developed at intelligence states existent are concerned.

Figure 6A:
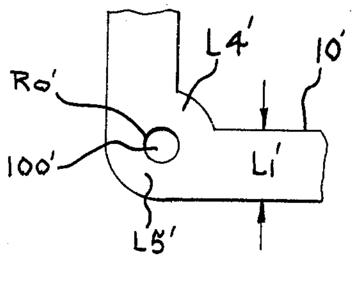
FIGURE 6A depicts an alternative core embodiment for use with the input scheme of FIGURE 6.

The embodiment shown in FIGURE 6A is an alternative core from wherein the general core shape of core 10' is as in FIGURE 6 with the modification of the apertures $R_O$ and $R_E$ such that the sum of the cross-sectional areas of legs $L_4'$ and $L_5'$ is slightly larger than the cross-sectional area of leg $L_1'$, e.g. by 10% to 20%. This provision causes part of the material in legs $L_4'$ and $L_5'$ to be unsaturated even though leg $L_1'$ is completely saturated. Furthermore, since $L_4'$ is considerably shorter than leg $L_5'$, it can be shown that leg $L_4'$ will accommodate the unsaturated material, whereas leg $L_5'$ will remain saturated. If a zero is transferred and the input loop current happens to be too high, there will result a local flux switching around the input minor aperture, but hardly any flux switching around the major aperture $O_1$. Although such local switching, called flux clipping, substracts from the switching around the major aperture also when a one is transferred, the net effect is desired because of an increase in signal-to-noise ratio. In FIG. 6, flux clipping is achieved by switching leg $L_4$ only elastically; in FIGURE 6A, flux clipping is achieved by switching leg $L_4'$ both inelastically and elastically. The advantage of the geometry in FIG. 6A compared with FIG. 6 is that flux clipping by inelastic switching requires less MMF than by elastic switching, and thus is more effective because less undesired flux will switch around the major aperture $O_1$, which is in parallel with leg $L_4'$.

Figure 7:
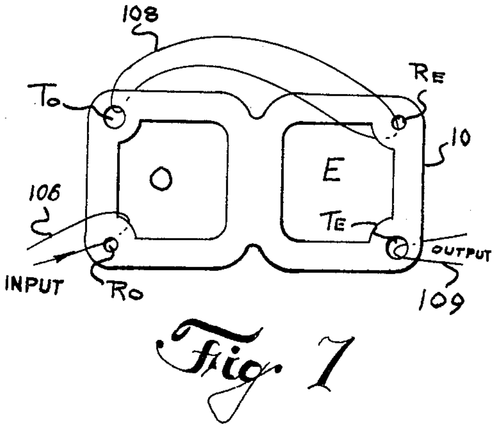

A further alternative with respect to input windings is shown in FIGURE 7 with respect to core 10 having core halves O and E and apertures $T_O$, $T_E$, $R_O$ and $R_E$. In this embodiment, an input or coupling winding 106 is threaded about the inner leg of core half O adjacent aperture $R_O$. A coupling winding 108 is provided threading the outer leg of O adjacent $T_O$ and the inner leg of $T_E$ adjacent $R_E$. An output is provided by winding 110 threading outer leg of core E. As with the embodiments of FIGURE 6 and the circuits above described, the particular advance, prime, hold and other turns may be employed with no substantial change in the function of the circuit or in the operation of the core as viewed from the various inputs and outputs of the circuit.

Figure 8:
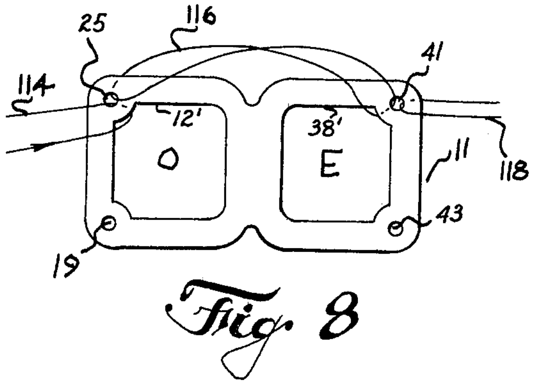
FIGURE 8 is a diagrammatic view of a slightly different core geometry including windings for yet a further mode of input.

FIGURE 8 shows an alternative transfer winding circuit incorporated with a core structure somewhat modified from the core structure heretofore described. In this embodiment, core 11 includes an external geometry identical to that of core 10 shown in FIGURE 1. The internal geometry, including the major apertures 12′ and 38′ of each core half, is the same as core 10 in FIGURE 1. Minor apertures 19 and 41 are also identical to apertures 18 and 40 described with respect to the core structure 10. The distinction between core 11 and core 10 lies in apertures 25 and 43 which are of the same diameter as apertures 19 and 41 such that there is substantially the same material cross-sectional area at each of the four minor apertures of the core. The geometry of core 11 permits the core to be utilized in the manner and by the circuits heretofore described with some possible sacrifice in the operating characteristics with respect to the transfer of pulses representing the zero intelligence state. Cores of the geometry shown with respect to core 11 are, however, preferable in certain instances including the use of so-called "holdless" circuits having inputs as indicated by the windings shown thereon.

The transfer portion of a "holdless" circuit includes an input winding 114 coupling the inner leg adjacent aperture 25 which may be considered with respect thereto as an input aperture. Coupling winding 116 coupling core halves O and E links the outer leg adjacent aperture 25 and the inner leg adjacent aperture 41; aperture 25 being a transmitter aperture with respect thereto and aperture 41 being with respect thereto a receiver aperture. Also linking aperture 41 is an output winding 118 threaded about the outer leg of the E half making aperture 41, with respect thereto, also a transmitter aperture. The advance and prime circuits shown and described with respect to FIGURES 3 and 5 may be utilized for the core and circuit shown in FIGURE 8 with the $N_h$ turns eliminated. It is for this reason that the circuit depicted in FIGURE 8 is termed "holdless." The core shape shown in FIGURE 8 has substantial flexibility since the coupling and transfer windings there depicted can be applied in the same manner to apertures 19 and 43 as an alternative to the application shown. As a highly advantageous result of the circuit shown in FIGURE 8 and the core structure thereof, all of the coupling windings are on the same side of the core. More importantly, as will be appreciated by those familiar with the problems of MAD–R design, the provision of a core structure wherein the coupling loops need not be excessively long is of substantial advantage. The core geometries of the invention take this into consideration and provide considerable flexibility to the placement of apertures having either the T or R function. As will be demonstrated hereinafter, this can operate to simplify manufacturing procedures wherein all coupling windings are on the same side of the core mounting board with all advance and read-out windings on the other side of the board.

Figure 9:
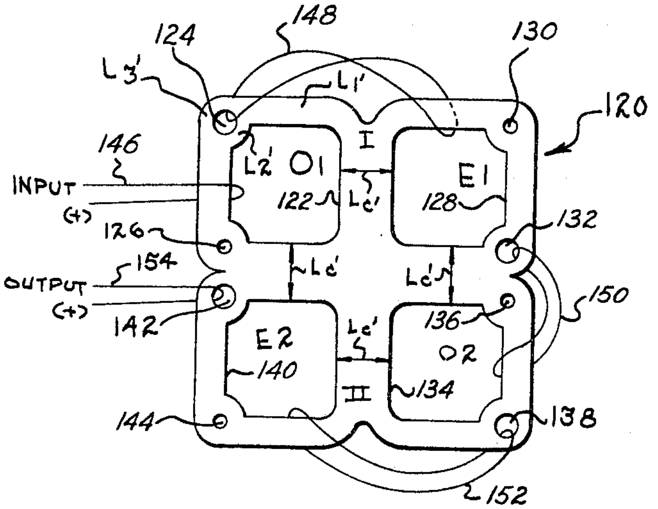
FIGURE 9 is a view of a further embodiment including a core geometry having four possible bit positions and having input and transfer windings placed to exemplify use of the core in circuits.

Turning now to a further embodiment of the invention, FIGURE 9 depicts a core geometry based upon the geometry described with respect to FIGURES 1–2. The core 120 includes the various features relating to shaping about the major and minor apertures in conjunction with the maintenance of relative path lengths with respect to major and minor apertures in each of two core halves as in core 10 of FIGURES 1 and 2. The dimensions $L_c'$ and $L_1'$ as well as $L_2'$, $L_3'$, etc., are also relatively proportional to the dimensions $L_c$, $L_1$, $L_2$, $L_3$ described with respect to the embodiment shown in FIGURES 1 and 2. The dimensions of the minor apertures of core 120 are identical to the minor apertures shown with respect to the core geometry of FIGURE 1; namely, of different diameters in each core half with respect to the transmitter and receiver minor apertures.

The maintenance of a geometry including substantially straight wall sections and relatively smooth curved corners enables core 120 to be manufactured in a manner avoiding warping, cracking or twisting during or after firing if the core is manufactured of a mechanically hard fired ferrite.

Core 120 is useful with any of the circuits employing two cores per bit of the type described in the aforementioned patent to J. P. Sweeney. It is particularly useful with any of the circuits above described with respect to the use of core 10. To indicate a preferred use, FIGURE 9 includes only the transfer windings employed; the advance and prime circuits and the particular advance, prime, and other turns being considered obvious in view of FIGURES 3–8. The major apertures of core 120 are labeled such that apertures 122 and 128 form intelligence bit position I (becoming core halves $O_1$ and $E_1$) and apertures 134 and 140 form a second bit position II (becoming core halves $O_2$ and $E_2$). An input winding 146 similar in use and function to the input windings above described is provided coupling the outer leg of core half $O_1$ and adapted to set such core half with binary intelligence. Minor aperture 124 is threaded with a coupling loop 148 linking the outer leg thereof to the major path of core half $E_1$ and adapted to transfer intelligence from $O_1$ to $E_1$ during the application of ADV. O. Minor aperture 132 is threaded with a coupling loop 150 linking the outer leg thereof to the major path of core half $O_2$ to transfer intelligence thereto. Aperture 138 is threaded with coupling loop 152 linking the outer leg thereof to the major path of core half $E_2$ and aperture 142 is threaded with an output loop 154 adapted to transfer intelligence out of core 120. Following the transfer cycle above described with respect to FIGURES 3 and 5, intelligence would be transferred from $O_1$ to $E_1$, $E_1$ to $O_2$, $O_2$ to $E_2$ and then out of the core. In this use, the apertures 126, 130, 136 and 144 may be utilized for read-out of the intelligence state in each core half. It is fully contemplated that the core geometry 120 could be differently labeled with respect to the placement or identification of core halves O and E with appropriate changes in drive and transfer windings. For example, apertures 122 and 134 might be identified as core halves $O_1$ and $E_1$ with the apertures 128 and 140 becoming core halves $O_2$ and $E_2$, respectively. As a further example, apertures 122 and 140 might be made to serve as halves $O_1$ and $E_1$ with apertures 128 and 134 serving as halves $O_2$ and $E_2$.

Figure 10:
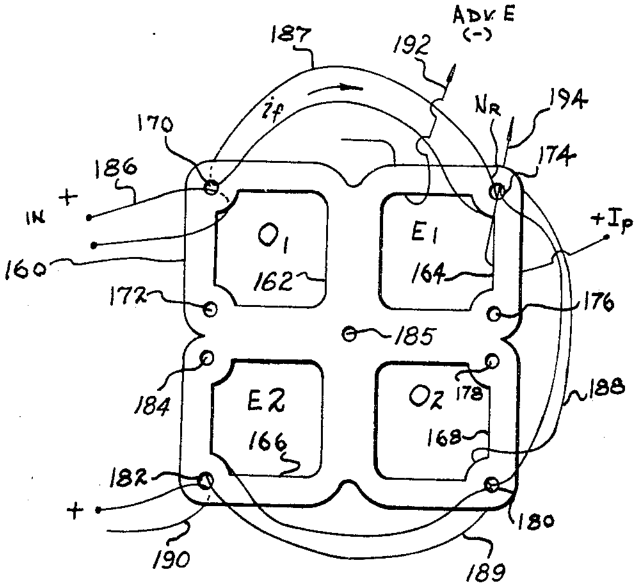
FIGURE 10 is a view of yet a further core geometry similar to that of FIGURE 9 but including minor apertures of equal diameter and a partial circuit adapted to effect an alternative flux orientation to define intelligence states.

FIGURE 10 depicts a further core geometry 160 which may be considered as identical to the geometry shown in FIGURE 9 with the exception that the minor apertures 170, 176, 184 and 180 are made identical to the other minor apertures 172, 174, 178 and 182 in the same manner as the transition made with respect to the core geometry of FIGURE 8. This embodiment may be considered as quite flexible with respect to the identification of core halves since any of the major apertures 162, 164, 166, 168 may be labeled and identified as $O_1$, $E_1$, $E_2$, $O_2$, or $E_2$; the remaining apertures being appropriately identified. As an additional feature, a single central aperture 185 is provided at the juncture of the common legs of the core. Aperture 185 is of the same diameter as the other minor apertures and serves the purpose of providing better definition of flux boundaries between core halves, and quarters. Additionally, aperture 185 may be utilized in writing information into one or more bits. For example, parallel loading of a core may be achieved by a number of windings threading the core major apertures through 185. Also, aperture 185 may be utilized to accommodate a single winding threading all or any of the four major apertures to achieve a desired clear-reset function wherein distinct bit positions are driven to an initial clear or set condition prior to performing some logic, coding or counting function. Core 120, previously described, could, of course, be modified to include a central minor aperture similar to 185 for the same purpose. The core geometry 160, of course, lends itself to any of the circuits heretofore shown and especially to the circuit shown with respect to FIGURE 8.

The abbreviated windings shown linking core 160 demonstrate the use of the alternate scheme of flux orientation possible with the core of the invention. In this use, the magnetization states for the O core halves are as heretofore described and the states for the E core halves are reversed such that positive saturation defines the zero state and half positive, half negative saturation defines the one state. This is accomplished by the polarity of windings employed.

Utilizing the circuit scheme shown in FIGURE 8, core half $O_1$ is provided with an input loop adapted to set $O_1$ in the standard fashion. The advance and prime turns would be as heretofore described with respect to the O core halves. The various windings linking the E core halves are, however, relatively reversed such as to provide the alternative magnetization states. This is shown with respect to core half $E_1$ wherein the coupling loop 187 linking $O_1$ is wound through the $T_E$ aperture of $E_1$ in a sense to provide an MMF $N_R i_f$ driving $E_1$ in clockwise sense about the major aperture thereof. The prime winding 194 is in a sense tending to switch flux in the clockwise sense about aperture $T_E$ of $E_1$ and the coupling winding 188 linking $O_2$ is in a sense to produce an output setting $O_2$ responsive to core $E_1$ being set by advance MMF supplied by advance winding 192. The core half $E_2$ would be similarly wound to include coupling loop 189 from $O_2$ and output winding 190.

Figure 10A:
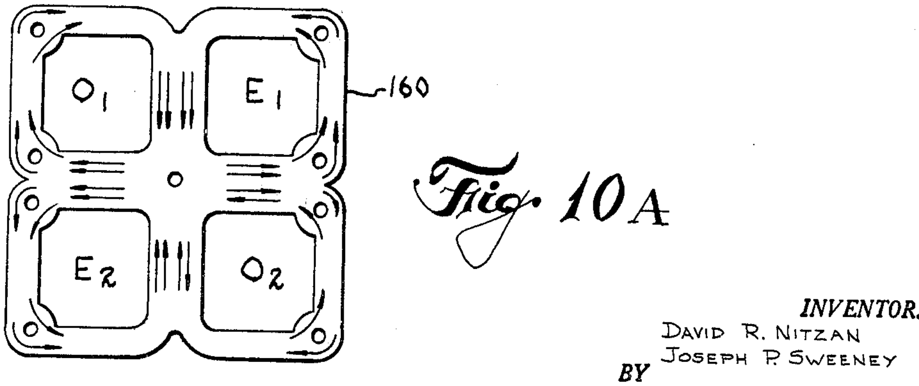
FIGURE 10A is a schematic diagram of the core of FIGURE 10 showing alternative flux states.

FIGURE 10A shows flux patterns in core halves in accordance with the above alternative choice of flux orientation to define core intelligence states. Thus, core half $O_1$ is negatively saturated to define the zero state with half $E_1$ in positive saturation to define the zero state. Half $O_2$ is in the set or one state heretofore described and half $E_2$ is in the zero state being negatively saturated.

Figure 11:
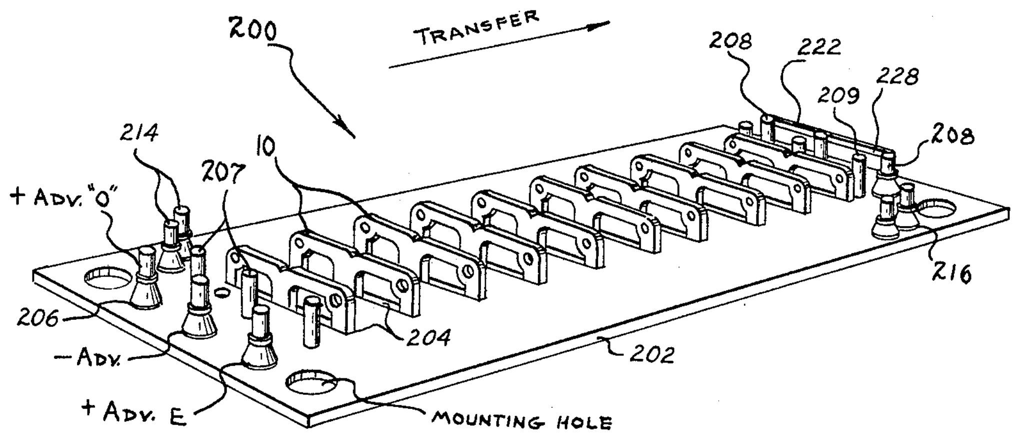
FIGURE 11 is perspective of a twenty bit shift register employing the core of FIGURE 1 in a preferred packaging and circuit scheme.

Turning now to a further aspect of the invention, FIGURES 11–18 show a preferred technique of packaging permitted by the novel core shape of the invention in conjunction with a type of circuit amenable to mass production wiring. FIGURE 11 shows in perspective a ten bit shift register comprising ten cores of the type shown and described in FIGURES 1–2 mounted in an insulating board member 202 and adapted to be threaded by appropriate drive and transfer windings connected to terminal posts 206 and 208 also mounted in the board member. Posts 206 extend through board 202 and posts 208 extend only partially through the board. Input and output terminal posts 214 and 216 are provided along the edges of board 202 and insulating posts 207 and 209 are provided adjacent each end of the cores to serve windings linking the cores. The usual assembly procedure followed calls for cores 10 to be fitted and cemented within slots such as 204 disposed along the length of the board in a manner whereby the core major and minor apertures are aligned. Following this step, the various advance, prime, coupling, input and output windings are applied and connected to the various terminal posts as shown.

The particular advance and prime circuit shown in FIGURES 12–18, is substantially identical to that shown in FIGURE 5, heretofore considered, with the coupling loops being as shown in FIGURE 7. The significant difference between the circuit of FIGURE 5 and the circuit of FIGURES 12–19, lies in the use of "linear" wiring rather than in "lumped" wiring; the latter being preferable from the standpoint of reducing wiring labor and avoiding wiring error for obvious reasons.

Figure 12:
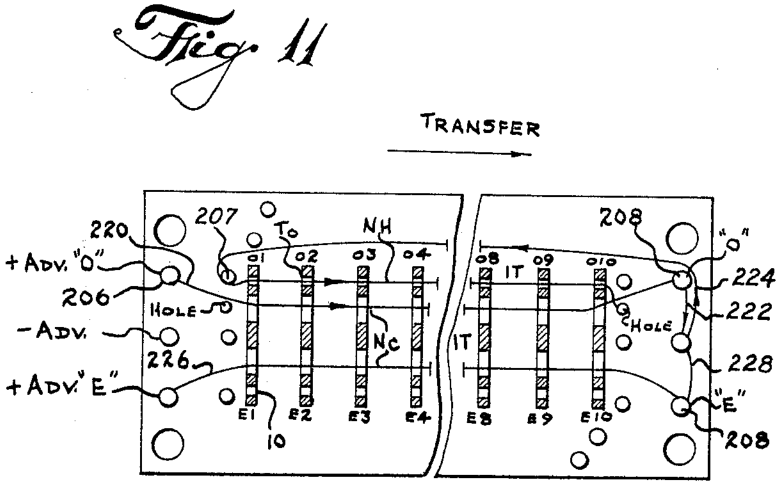
FIGURES 12–18 are plan views of the device of FIGURE 11 showing the wiring scheme thereof in detail.
Figure 13:
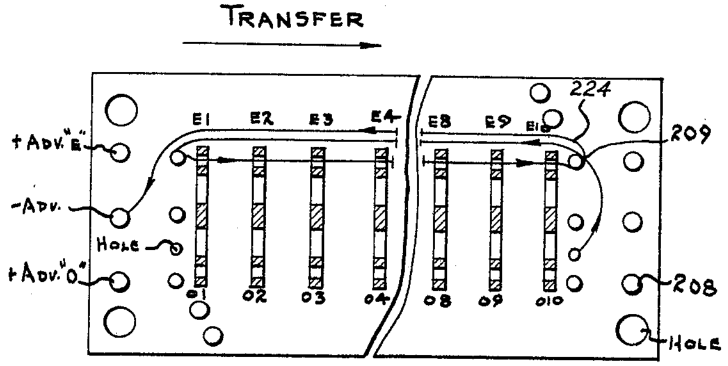

Considering now the advance circuit, FIGURE 12 shows an ADV. O lead 220 threaded through the major apertures of core halves $O_1$–$O_{10}$ and connected to the plus ADV. O terminal 206 and to an opposite terminal post 208 at the other end of the assembly board 202. This first turn of the ADV. O circuit may be considered as the $N_c$ turn. As shown in FIGURE 11, terminal posts 208 are commoned by bus bars 222 and 228. A further part of the ADV. O circuit is formed by a lead 224 connected to the center terminal post 208 and extending along the core column and back through the transmitting apertures $T_O$ of each of the cores $O_1$–$O_{10}$ to form the $N_h$, $N_x$ turns function of the advance circuit. Lead 224 thereafter extends through a hole in board member 202 to the other side of the board and as shown in FIGURE 13, down along the column of cores to the other end around an insulating post 209 and back through the apertures $T_E$ of the core halves $E_1$–$E_{10}$, to form the $N_h$, $N_x$ turns of the advance E circuit. Lead 224 thereafter extends again along the column of cores and is connected to the central terminal post 206, to form the negative connection for the advance circuit. The ADV. E circuit is completed by a single $N_c$ turn threaded serially through cores $E_1$–$E_{10}$ formed from lead 226 connected to the plus ADV. E terminal 206 and to terminal 208 at the opposite end of the column of cores, which is in turn commoned by bus bar 228 to the other terminal post 208 as shown in FIGURE 12.

In operation, the advance circuit, utilizing the number of turns shown, works in the same manner as the circuits heretofore described to effect a transfer of intelligence from the O core halves, to the E core halves, to an adjacent O core half, etc. Thus, viewing FIGURES 12 and 13, during the application of the ADV. O pulse, all of the O core halves $O_1$–$O_{10}$ are driven into the clear state by turns $N_c$ from lead 220, with the advance pulse being applied by the $N_x$ turns to the transmitter apertures $T_O$. Lead 224 thereafter serves to provide the ADV. O pulse to the $T_E$ windings threading the core halves $E_1$–$E_{10}$, as shown in FIGURE 13, in a sense to perform the $N_h$ function with respect to the E core halves. The ADV. E pulse on winding 226 operates to clear core halves $E_1$–$E_{10}$, and in the manner above described, energize the $N_h$, $N_x$ windings by lead 224, the only path available to the advance pulse.

Figure 15:
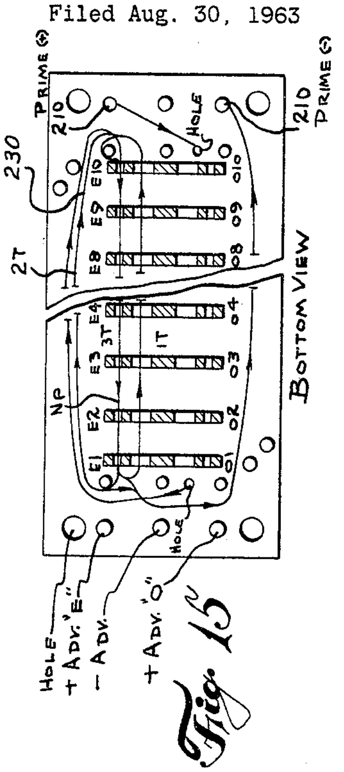
Figure 14:
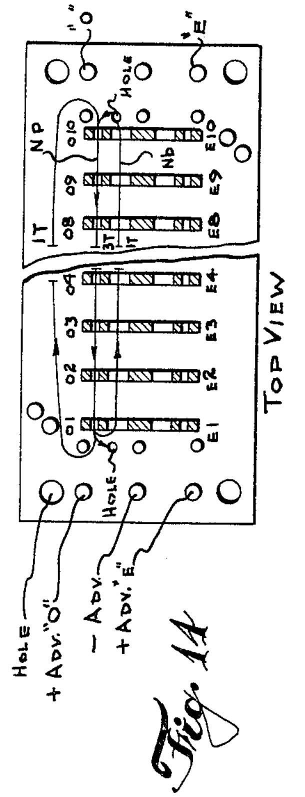

FIGURES 14 and 15, show the prime circuit which also employs "linear" windings with the number of turns shown. Tracing the prime circuit from positive prime, at terminal 210 (from FIGURE 15 through the hole to FIGURE 14) lead 230 threads the $T_O$ apertures of core halves $O_1$–$O_{10}$ in a sense to prime each of the O core halves by turns $N_p$ and thereafter threads the major core apertures of the O core halves by winding turns identified as $N_b$. Winding 230 thereafter passes through a hole in the board to form the circuit as shown in FIGURE 15, by providing turns $N_b$ and $N_p$ to the core halves $E_1$–$E_{10}$, with the circuit continuing to the negative prime terminal 210.

Figure 16:
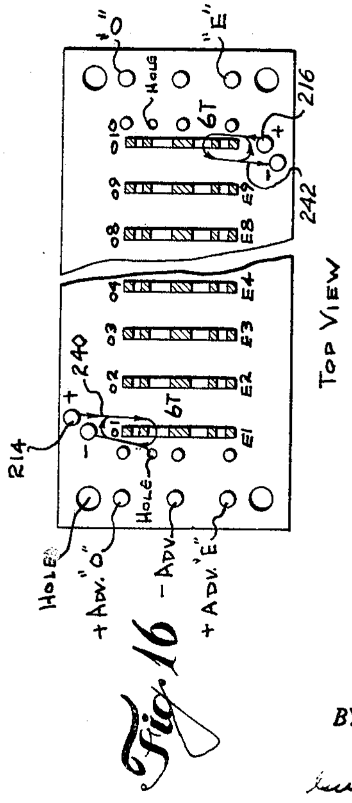

FIGURE 16 shows the circuit input and output windings 240 and 242, respectively. Input winding 240, connected across terminals 214, is comprised of turns through the major aperture core half $O_1$, the winding threading the core half and encircling the core in the manner shown in FIGURE 5, in a sense as to set the core. The output winding 242, connected across terminals 216 and threading the core half $E_{10}$ include major aperture turns encircled about the core half in a sense to provide an output pulse in the polarity shown, responsive to core half $E_{10}$ being cleared by ADV. E. Separate input, output or sampling windings may be employed along the core column length and terminated to additional posts positioned as 214 and 216.

Figure 17:
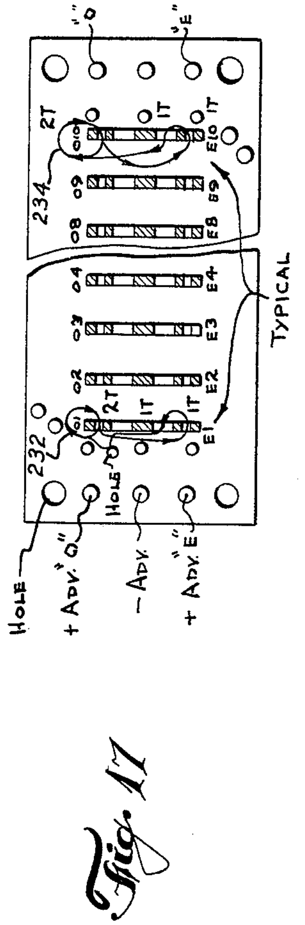

FIGURE 17 shows the O to E coupling utilized with the circuit above described; only the first and last coupling loops being included for clarity. Tracing coupling loops 232, 234 finds turns $N_t$ passing through aperture $T_O$ about the outer leg thereof and thereafter one turn passing through $R_E$ about the inner leg of the aperture, in the manner more clearly shown in FIGURE 7 above. The senses and turns ratio indicated operate to assure a proper gain and direction of transfer from core half O to core half E in each case as above described.

Figure 18:
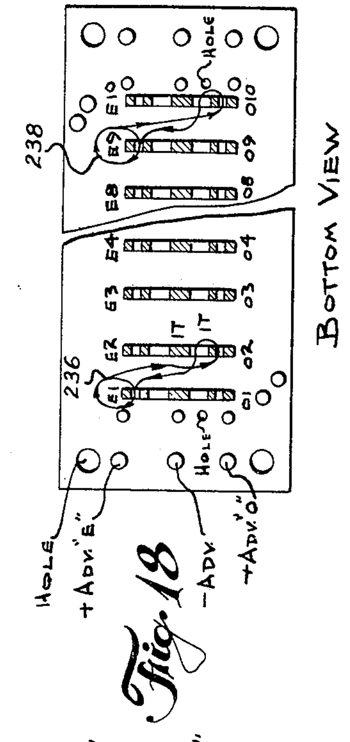

FIGURE 18 shows the coupling windings 236 and 238 coupling different cores such as between the core forming $O_1$, $E_1$ and the core forming $O_2$, $E_2$. Thus, winding 236 threads core half $E_1$ through the outer leg adjacent aperture $T_E$ and the inner leg of aperture $R_O$ of core half $O_2$ by the turns and in the sense indicated.

The shift register, packaged and wound in accordance with FIGURES 11–18, may be placed in series with another shift register of similar or different bit length by merely extending the advance and prime circuits as above shown. As will be apparent from FIGURES 11–18, the core geometry of the invention lends itself to substantial packaging advantages, including density based on number of bits per cubic inch as well as winding simplification.

The assembly shown in FIGURES 11–18 can, through the teaching of the techniques relative thereto, be adapted to utilize the other core shapes and circuits above treated.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. A bistable state core utilized to handle binary intelligence, comprised of an integral structure of saturable magnetic material having a substantially square hysteresis characteristic, including at least two major apertures positioned adjacent to each other in said structure, said major apertures being individually defined by noncommon legs of magnetic material of a given flux capacity which is determined by the cross-sectional area through a noncommon leg of magnetic material transverse to the axis of flux orientation defining a given stable state and by a common leg of magnetic material of substantially twice the said given flux capacity at a cross-sectional portion of said common leg relative to a cross-sectional portion of said noncommon legs, said core including a minor aperture extending through a noncommon leg for each of said major apertures defining a minor leg of magnetic material in which flux may be switched therein to define an intelligence output from said core.

2. The magnetic core of claim 1 wherein the length of the path of magnetic material of said common leg is a substantial fraction of the length of the path of magnetic material of the noncommon legs of one of said major apertures.

3. The magnetic core of claim 1 wherein the noncommon legs of magnetic material include at least a single minor aperture defining within the material two separate legs of substantially equal flux capacity.

4. The magnetic core of claim 1 wherein the noncommon legs of magnetic material include at least a single minor aperture defining within the material two separate legs of different flux capacity.

5. The magnetic core of claim 1 wherein the noncommon legs defining each major aperture include minor apertures of different diameters such that the total flux capacity of material of cross-section at a larger diameter minor aperture is slightly less than the flux capacity of a material cross-section of the smaller minor aperture.

6. The magnetic core of claim 5 wherein the minor apertures are positioned at intersections of the noncommon legs particular to each major aperture.

7. An improved magnetic core capable of use in handling binary intelligence comprising an integral core structure of saturable magnetic material having at least two major apertures adjacent to each other positioned to define material portions including a central material leg of a given flux capacity and outer legs of substantially half flux capacity of the given leg, at least two minor apertures positioned in said outer legs to define material portions including material legs of substantially half the flux capacity of said outer legs.

8. A magnetic core device of the type utilized to handle binary intelligence comprised of an integral structure of saturable magnetic material having a substantially square hysteresis characteristic, the said structure including at least two material paths defined by major and adjacent apertures with each said path having a given flux capacity sufficient to define states of magnetization representative of binary one or zero in said paths, each said path including a minor aperture defining legs of magnetic material each having a flux capacity approximating half said given flux capacity and sufficient to provide, upon the material of the leg being rapidly switched, at least a magnetomotive force quantity sufficient to drive a material path into a state of magnetization representative of a binary one.

9. A magnetic core structure of the type utilized to handle intelligence in binary form as represented by defined stable states of magnetization comprised of an integral magnetic core structure having at least two major apertures and at least two minor apertures, one major aperture and one minor aperture forming a first core half, the other major aperture and minor aperture forming a second core half, each core half having a configuration including outer legs of substantially the same cross-sectional area along the length thereof whereby to permit substantially all of the magnetic material forming the respective core half to be driven into saturation, the combined core halves having a configuration including a common leg of substantially constant cross-sectional area along its length which is approximately twice the cross-sectional area of the said outer legs whereby to permit substantially all of the magnetic material forming one core half to remain in a state of saturation with the magnetic material of the other core half driven to have a net saturation of zero.

10. An improved magnetic core of the type utilized to handle binary intelligence including an integral core structure capable of sustaining distinct stable states of remanence representative of at least two intelligence bits, simultaneously, the core structure including at least two major and two minor paths of possible flux closure with one of said minor paths associated with one of said major paths and with said major paths being adjacent the relative lengths of said paths being such that the saturation drive of one minor path is approximately one-third of an adjacent major path and threshold of such major path is approximately one-half of the threshold of a path about both major paths, the latter paths being mean paths.

11. The core of claim 10, wherein the said structure includes two generally rectangular major apertures forming said major paths and four generally circular minor apertures forming said minor paths.

12. The core of claim 10, wherein the said structure includes four generally rectangular major apertures forming said major paths and eight minor apertures forming said minor paths.

13. The core of claim 12, wherein there is included a further minor aperture equally spaced from a common point of each of said major apertures.

14. An improved magnetic core device including at least a single integral core structure of saturable magnetic material having at least two major apertures positioned to define first and second distinct paths of flux closure including a central leg of a given flux capacity and outer legs of substantially half the said given flux capacity, at least a single minor aperture in an outer leg, means linking said major apertures and adapted to drive said first and second paths into saturation, means linking said minor apertures and adapted to prime flux thereabout, input means linking said first path to drive such into a stable state of magnetization, transfer means linking the first path to the second path to drive the second path into a stable state of saturation responsive to the first path being driven into saturation and output means linking the second path to produce an output responsive to said second path being driven into saturation.

15. The device of claim 14, wherein the said means to drive the first and second paths into saturation threads the said first and second core paths in the same relative sense and the input means to the first path and the transfer means from the first path to the second path thread each respective path in the same relative sense.

16. The device of claim 14, wherein the said means to drive the first and second paths into saturation threads the first and second core paths in a relatively opposite sense and the input means to the first path and the transfer means from the first path to the second path thread each respective path in a relatively opposite sense.

17. An improved magnetic device including a multi-aperture magnetic core integrally formed of saturable magnetic material to define at least two possible intelligence bit positions in first and second core halves, means linking the first core half and adapted to drive such half into a state of magnetization representative of one or zero, means linking the first core half to the second core half and adapted to transfer the state of magnetization of the first core half to the second core half responsive to the first core half being driven into negative saturation, means linking the second core half to other means and adapted to transfer the state of magnetization of the second core half to said other means responsive to the second core half being driven into negative saturation, means linking each core half and adapted to controllably drive one of the other core halves into a state of negative saturation to effect the transfers of magnetization states.

18. An improved magnetic core device including an integral core structure of saturable magnetic material having first and second major apertures defining major paths of possible flux closure capable of being differentially driven into clear and set states of magnetization representative of binary intelligence, minor apertures positioned within said paths defining legs of magnetic material therein of a given flux capacity, means linking each major aperture and adapted to controllably drive the separate major paths thereof into set or clear states of magnetization, means linking the first major aperture and adapted to drive the major path thereof into a set state of magnetization, means linking the minor aperture associated with said first major aperture and adapted to reverse the sense of flux in the outer leg thereof following the setting of the major path about such aperture, means linking the outer leg of said minor aperture to the major path of the second major aperture and adapted to transfer flux of said given capacity thereto responsive to the clearing of said first major aperture path to thereby transfer intelligence from major path to major path, means linking the minor aperture of said second major aperture and adapted to transfer flux of said given capacity responsive to the clearing of said second major aperture major path.

19. An improved magnetic core device of the type utilized to handle binary intelligence comprised of a plurality of cores each including in an integral structure at least two major apertures individually defined by non-common legs of magnetic material of a given flux capacity and by a common leg of magnetic material of substantially twice the flux capacity of any cross-sectional portion of said non-common legs wherein each said core defines two possible intelligence bit positions, at least a minor aperture associated with each major aperture, advance means linking said major apertures and adapted to drive the magnetic material therearound into saturation to advance intelligence from aperture to major aperture within a core and to advance intelligence from core to core, prime means linking the said minor apertures of each core to prime flux about such minor aperture prior to the advance of intelligence, input coupling loop means linking the first core of said plurality of cores to input intelligence, transfer coupling loop means linking the major apertures of each core, output coupling loop means linking each core to each adjacent core, whereby intelligence may be transferred from bit position to bit position responsive to operation of said prime and advance means.

20. An improved magnetic core device of the type utilized to handle binary intelligence comprised of a plurality of integral structures of saturable magnetic material each having a substantially square hysteresis characteristic, each said structure including at least first and second major apertures with at least a minor transmitting aperture adjacent each major aperture, first advance means linking the said first major aperture of the cores to drive the material about such major aperture into saturation, second advance means linking said second major aperture of the cores to drive the material thereabout into saturation and prime means linking the said minor transmitting apertures of the cores to prime flux thereabout prior to intelligence transfer, an input coupling loop linking the first core half to input intelligence thereto and transfer coupling loops linking the material about the first and second major apertures of the cores, transfer coupling loops linking the material about the second major aperture of each core to the material about the first major aperture of each adjacent core, whereby intelligence may be transferred through the said core device in a controlled manner responsive to advance and prime means operation.

21. An improved magnetic core assembly comprised of multi-aperture cores of saturable magnetic material, each having at least two major apertures with at least an adjacent transmitting minor aperture, the said multi-aperture cores mounted with the major apertures thereof and the minor apertures thereof in axial alignment, a first advance winding linking the same respective major aperture of each of the cores and a second advance winding linking the other major aperture of each of the cores, each of the advance windings being adapted to alternatively drive the material about each aperture into saturation, a prime winding linking the transmitting minor aperture of each core half and adapted to prime flux locally thereabout, input coupling loop means to a first of said cores, output coupling means from the last of said cores, coupling loop means linking the material about one major aperture to the material about the other major aperture of each core, coupling loop means linking the material about the said other major aperture of each core to the material about the said one major aperture of an adjacent core.

22. The device of claim 21, wherein the said advance windings thread the respective major apertures by common turns and the prime winding threads the transmitting minor apertures of the cores by common turns.

23. The device of claim 21, wherein each core includes a plurality of other minor apertures and all minor apertures are positioned at opposite ends of the core spaced by the major apertures.

24. An improved magnetic device including a plurality of multi-aperture magnetic cores integrally formed of saturable material to define at least two possible intelligence bit positions in first and second core halves, each of the cores of said plurality of cores mounted intersecting an insulating board member with the apertures-thereof exposed and in alignment, coupling means linking the first and second halves of each core nad adapted to transfer the intelligence content of each half to the other core half responsive to the first core halves being driven into negative saturation, coupling loops linking the second core halves of a given core to the first core half of an adjacent core and adapted to transfer the intelligence state of the second core halves to the first core halves responsive to the second core halves being driven into negative saturation, means linking all of the first core halves with a source of advance current adapted to drive all of the first core halves simultaneously into negative saturation, means linking the second core halves of all of the cores with a source of advance current adapted to drive the second core halves simultaneously into negative saturation, means linking at least one of the plurality of cores to drive the first core half thereof into the state of magnetization representing an input to the plurality of cores and means linking the second core half of at least another of said cores to drive a utilization device responsive to the said core half being driven into negative saturation.

25. An element of magnetic material having two remanent states; first, second and third legs of said element being of substantially equal length and cross-sectional area; a fourth leg of longer length but of substantially equal cross-sectional area; said fourth leg having two apertures therethrough; and other portions of said element interconnecting the flux within said legs and having cross-sectional areas substantially twice the cross-sectional area of the aforementioned legs.

References Cited

UNITED STATES PATENTS

| | | | |
|---|---|---|---|
| 2,934,747 | 4/1960 | Slonczewski | 340—174 |
| 3,050,715 | 8/1962 | Stabler | 340—174 |

JAMES W. MOFFITT, Primary Examiner

PO-1050
(5/69)

UNITED STATES PATENT OFFICE
CERTIFICATE OF CORRECTION

Patent No. 3,490,008 Dated January 13, 1970

Inventor(s) DAVID NITZAN and JOSEPH P. SWEENEY

It is certified that error appears in the above-identified patent and that said Letters Patent are hereby corrected as shown below:

Column 18, line 65, following "saturable" the word - - - magnetic - - - should be inserted.

Column 18, line 70, "nad" should read - - - and - - -.

SIGNED AND
SEALED
JUL 14 1970

(SEAL)
Attest:

Edward M. Fletcher, Jr.
Attesting Officer

WILLIAM E. SCHUYLER, JR.
Commissioner of Patents